United States Patent Office 3,022,309
Patented Feb. 20, 1962

3,022,309
BERBINE DERIVATIVES
Georges Muller, Nogent-sur-Marne, France, assignor to Les Laboratoires Francais de Chimiotherapie, Paris, France, a corporation of France
No Drawing. Filed May 4, 1960, Ser. No. 26,721
Claims priority, application France May 5, 1959
14 Claims. (Cl. 260—287)

The invention relates to novel tetracyclic alkaloids and, more particularly, relates to berbine derivatives of the general Formula X:

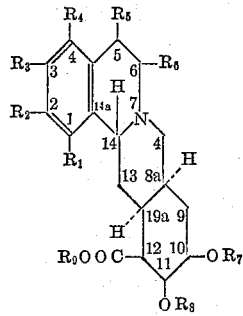

wherein $R_1$ to $R_4$ are radicals selected from the group consisting of hydrogen, halogen, hydroxyl, lower alkyl, lower alkoxy and aralkoxy; $R_5$, $R_6$ and $R_8$ are radicals selected from the group consisting of hydrogen or lower alkyl; $R_7$ is a radical selected from the group consisting of hydrogen and the acyl radical of a hydrocarbon carboxylic acid having one to eighteen carbon atoms of the aliphatic, aromatic or araliphatic series; and $R_9$ is a radical selected from the group consisting of alkyl, aryl and aralkyl; intermediates useful in preparing compound X and processes for the production of these compounds.

These compounds possess interesting pharmacodynamic properties and are hypotensors.

An object of the present invention is to obtain a berbine derivative having the structural formula:

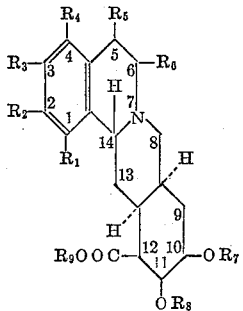

wherein $R_1$ to $R_4$ are radicals selected from the group consisting of hydrogen, halogen, hydroxyl, lower alkyl, lower alkoxy and aralkoxy; $R_5$, $R_6$ and $R_8$ are radicals selected from the group consisting of hydrogen or lower alkyl; $R_7$ is a radical selected from the group consisting of hydrogen and the acyl radical of a hydrocarbon carboxylic acid having one to eighteen carbon atoms of the aliphatic, aromatic or araliphatic series; and $R_9$ is a radical selected from the group consisting of alkyl, aryl and aralkyl.

Another object of the present invention is to obtain 2,3,11α - trimethoxy - 10β - (3',4',5' - trimethoxybenzoyloxy)-12β-carbomethoxy-8aα, 9, 10, 11, 12, 12aα-hexahydro-14β-berbine, especially in the form of the levo-rotatory (chloroform) product having a melting point of 191° C. and a specific rotation $[\alpha]_D^{20} = -104°$ (c=0.5% in chloroform).

A still further object is the development of a process for the production of the berbine derivatives of compound X.

A further object of the invention is to obtain intermediates useful in producing 2,3-11α-trimethoxy-10β-(3',4',5' - trimethoxybenzoyloxy) - 12β - carbomethoxy-8aα, 9, 10, 11, 12, 12aα-hexahydro-14β-berbine such as:

(a) 2,3,11α - trimethoxy - 10β - acetoxy - 12β - carbomethoxy-8aα, 9, 10, 11, 12, 12aα-hexahydro-7-14, 14-14a-diseco-7-dehydro-berbine-14-oic acid, (b) 2,3,11α - trimethoxy - 10β - acetoxy - 12β - carbomethoxy-8aα, 9, 10, 11, 12, 12aα-hexahydro-7-14, 14-14a-diseco-berbine-14-oic acid, (c) 2,3,11α - trimethoxy - 10β - acetoxy - 12β - carbomethoxy-14-oxo-8aα, 9, 10, 11, 12, 12aα-hexahydro-14-14a-seco-berbine, (d) 2,3,11α - trimethoxy - 10β - acetoxy - 12β - carbomethoxy-8aα, 9, 10, 11, 12, 12aα-hexahydro-13(14)-dehydro-berbine, (e) 2,3,11α - trimethoxy - 10β - acetoxy - 12β - carbomethoxy-8aα, 9, 10, 11, 12, 12aα-hexahydro-14α-berbine, (f) 2, 3,11α - trimethoxy - 10β - acetoxy - 12β - carbomethoxy-8aα, 9, 10, 11, 12, 12aα-hexahydro-14β-berbine, (g) 2,3,11α - trimethoxy - 10β - hydroxy - 12β - carbomethoxy-8aα, 9, 10, 11, 12, 12aα-hexahydro-14β-berbine.

These and further objects of this invention will become apparent as the description proceeds.

In accordance with the invention, berbine derivatives of the general formula:

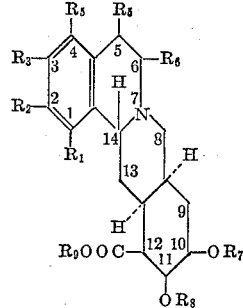

wherein $R_1$ to $R_4$ are radicals selected from the group consisting of hydrogen, halogen, hydroxyl, lower alkyl, lower alkoxy and aralkoxy; $R_5$, $R_6$ and $R_8$ are radicals selected from the group consisting of hydrogen or lower alkyl; $R_7$ is a radical selected from the group consisting of hydrogen and the acyl radical of a hydrocarbon carboxylic acid having one to eighteen carbon atoms of the aliphatic, aromatic or araliphatic series; and $R_9$ is a radical selected from the group consisting of alkyl, aryl and aralkyl; are prepared starting from a cyclic amine having the Formula I:

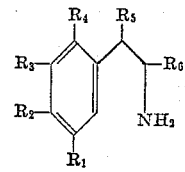

where $R_1$, $R_2$, $R_3$, $R_4$, $R_5$ and $R_6$ have the previously assigned values. Among the various cyclic amines which can be utilized as a starting compound for the preparation of berbine derivatives of the general Formula X are β - phenylethylamine, 2 - phenylpropyl - 1 - amine, β-(3 - chlorophenyl) - ethylamine, β - (4 - methylphenyl)-ethylamine, β - (3 - methoxyphenyl) - ethylamine, homoveratrylamine or β - (3,4 - dimethoxyphenyl) - ethylamine, β - (4 - ethylphenyl) - ethylamine, β - (3 - ethoxyphenyl) - ethylamine, β - (3 - benzyloxyphenyl) - ethylamine, homovanillylamine or β - (3 - methoxy - 4 - hydroxy-phenyl)-ethylamine, etc.

This cyclic amine I is condensed with a cyclic aldehyde of the Formula II:

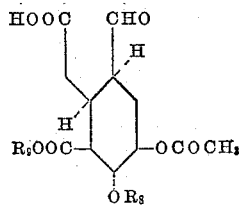

II where $R_8$ and $R_9$ have the previously assigned values, and particularly with dextro-rotatory 1β-carboxymethyl-2β-carbomethoxy-3α-methoxy - 4β - acetoxy-6β-formyl-cyclohexane having a specific rotation $[\alpha]_D^{20} = +42.5°$ (C=1% in pyridine). The racemic and the levorotatory stereoisomers may also be used in the reaction. Since the substituents $R_8$ and $R_9$ do not enter into the reaction, it is obvious that they can be any of the assigned radicals.

Condensation of the cyclic amine I with the cyclic aldehyde II results in a Schiff's base of Formula III:

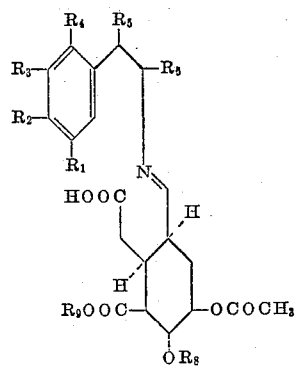

III

This Schiff's base III is reduced to give a secondary amine of Formula IV:

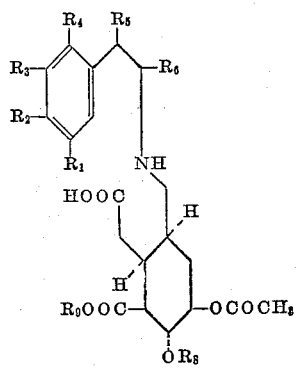

IV

This secondary amine IV is then cyclized into a lactam of Formula V:

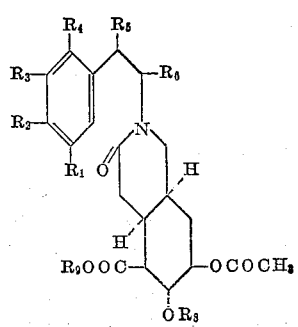

V

The lactam V is then cyclized into a tetracyclic compound of the Formula VI:

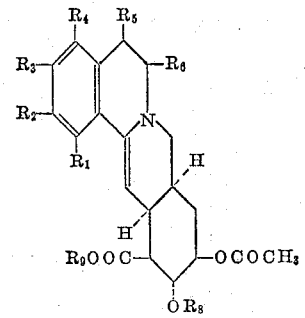

VI

The double bond in the 13(14) position is then reduced selectively to give a 14β-berbine derivative of the Formula VIII which is separated from its 14α-isomer which may form.

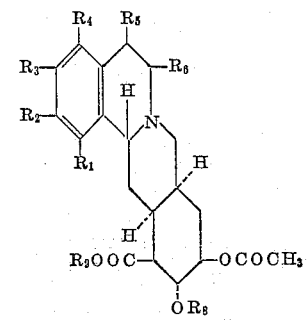

VIII

The double bond in the 13(14) position can optionally be reduced selectively to give a 14α-berbine derivative of the Formula VII:

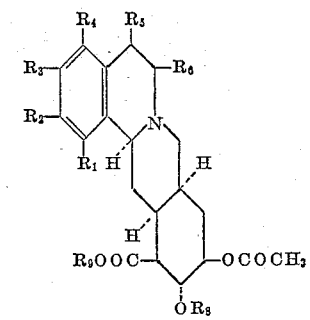

VII

Partial saponification of the 14β-berbine derivative VIII results in a compound with a free hydroxyl group in the 10β-position, of the Formula IX:

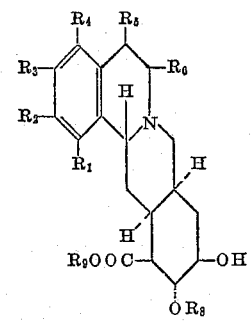

IX

Esterification of this last compound IX by an esterifying derivative of an aliphatic, aromatic or arylaliphatic hydrocarbon carboxylic acid having from one to eighteen carbon atoms results in the desired berbine derivative of Formula X.

In the above formulas the customary structural formula designations are used. The solid bond attached to unsaturated ring carbon atoms denotes a β-attachment and the dotted line bond denotes an α-attachment.

In carrying out the above reactions, it is preferable to proceed according to the following:

(a) The condensation of the cyclic amine I with the cyclic aldehyde II takes place in an aqueous solution of a water-miscible inert organic solvent such as dimethylformamide, (b) The reduction of the Schiff's base III is effected with the aid of an alkali metal borohydride in the cold, (c) The subsequent cyclization of the reduced product IV takes place under the effect of heating to give the lactam V, (d) The cyclization of the lactam V is effected by means of phosphorus oxychloride, (e) The selective reduction of the tetracyclic compound VI is effected by the action of zinc in a perchloric acid solution, (f) The separation of compound VIII from its 14α-isomer VII is effected by virtue of the difference in the solubilities of these two compounds in acetone, (g) The partial saponification of the reduced 14β-compound VIII is effected by means of an alkali metal borohydride, (h) The final esterification is brought about by a carboxylic acid chloride in the presence of pyridine.

This final esterification may be performed with an acid chloride of any hydrocarbon carboxylic acids having from one to eighteen carbon atoms of the aliphatic, aromatic or araliphatic series such as formic acid, acetic acid, pivalic acid, benzoic acid, 3,4,5-trimethoxy-benzoic acid, 3,4,5-trimethoxy-cinnamic acid, naphthoic acid, etc.

The following example of the process illustrates the invention without, however, limiting it. It describes the preparation of one of the novel derivatives of berbine, 2,3,11α - trimethoxy-10β-[3′,4′,5′-trimethoxybenzoyloxy]-12β - carbomethoxy - 8aα,9,10,11,12,12aα-hexahydro-14β-berbine, which is produced by the process of the invention. It is readily understood that other berbine derivatives of the structural Formula X can be produced by varying the starting cyclic amine I, the starting cyclic aldehyde II or the esterifying acid ($R_7$).

The melting points are instantaneous melting points, determined on a Kofler block. The temperatures are indicated in degrees centigrade.

EXAMPLE

*Preparation of 2,3,11α-trimethoxy-10β-[3′,4′,5′-trimethoxy - benzoyloxy] - 12β-carbomethoxy - 8aα,9,10,11, 12,12aα - hexahydro - 14β - berbine, X, wherein $R_1=R_4=R_5=R_6=H$, $R_2=R_3=OCH_3$, $R_8=R_9=CH_3$ and $R_7=trimethoxybenzoyl$*

*Step a.*—2,3,11α - trimethoxy - 10β-acetoxy-12β-carbomethoxy - 8aα,9,10,11,12,12aα - hexahydro - 7-14,14-14a-diseco-7(8) dehydro-berbine-14-oic acid (III, wherein $R_1=R_4=R_5=R_6=H$, $R_2=R_3=OCH_3$, $R_8=R_9=CH_3$).

5.6 gm. of dextro-rotatory (pyridine) 1β-carboxymethyl-2β - carbomethoxy - 3α-methoxy-4β-acetoxy-6β-formylcyclohexane obtained according to the copending, commonly-assigned United States patent application, Serial No. 727,780, filed April 11, 1958, now U.S. Patent No. 2,971,978, are mixed with 11.2 cc. of water and 2.8 cc. of dimethylformamide. 5.6 cc. of triethylamine, then a solution of 3.1 gm of homoveratrylamine in 4.6 cc. of dimethylformamide and 4.6 cc. of water are added dropwise to the mixture, cooled to —5° C. The mixture is agitated at —5° C. for twenty minutes. The resulting solution of the Schiff's base, 2,3,11α-trimethoxy-10β-acetoxy - 12β - carbomethoxy - 8aα,9,10,11,12,12aα-hexahydro - 7 - 14,14,14a - diseco-7(8)-dehydro-berbine-14-oic acid is directly used in the next stage of the synthesis.

*Step b.*—2,3,11α - trimethoxy - 10β - acetoxy-12β-carbomethoxy - 8aα,9,10,11,12,12aα - hexahydro - 7-14,14-14a-diseco-berbine-14-oic acid (IV, wherein $R_1=R_4=R_5=R_6=H$, $R_2=R_3=OCH_3$, $R_8=R_9=CH_3$)

1.8 gm of potassium borohydride are added to a solution of the Schiff's base, obtained in the preceding step by starting with 3.1 gm of homoveratrylamine, and the solution is cooled to —5° C. After an agitation of twenty minutes, the cooling is interrupted for a half an hour, then cooled again to +5° C. The 2,3,11α-trimethoxy-10β - acetoxy - 12β - carbomethoxy - 8aα,9,10,11,12,12aα-hexahydro-7-14,14-14a-diseco-berbine-14-oic acid formed thereby was used directly in the next step of the synthesis without being isolated from the medium of its preparation.

*Step c.*—2,3,11α - trimethoxy - 10β - acetoxy-12β-carbomethoxy - 14-oxo-8aα,9,10,11,12,12aα-hexahydro-14-14a-seco-berbine (V, wherein $R_1=R_4=R_5=R_6=H$, $R_2=R_3=OCH_3$, $R_8=R_9=CH_3$).

To the secondary amine in solution, as obtained in the preceding step, are added 7.5 cc. of acetic acid until neutral and several drops of ether to destroy the foam. At a pH of 6, solidification of the solution takes place 12 cc. of water are added and the mixture is heated while agitating to drive off the ether, the precipitate dissolves. The mixture is heated to 80° C. and maintained at this temperature for an hour and a half. The solution is cooled and is poured into 75 cc. of iced water. It is extracted with methylene chloride and the extract is washed successively with ammonia, with water, with hydrochloric acid and again with water, dried over magnesium sulfate and distilled to dryness. 9 gm (theoretical yield being 8 gm) of the raw 2,3,11α-trimethoxy-10β-acetoxy-12β-carbomethoxy - 14-oxo-8aα,9,10,11,12,12aα-hexahydro-14-14a-seco-berbine usable without any purification for the next stage of the synthesis is obtained.

*Step d.*—2,3,11α - trimethoxy-10β-acetoxy-12β-carbomethoxy-8aα,9,10,11,12,12aα-hexahydro-13(14)-dehydroberbine (VI, wherein $R_1=R_4=R_5=R_6=H$, $R_2=R_3=OCH_3$, $R_8=R_9=CH_3$).

9 gm. of the raw lactam produced by the preceding step are dissolved in 70 cc. of phosphorus oxychloride and the solution is refluxed for one and one half hours. After concentration in vacuo to about 30 cc., it is cooled to —5° C. and, under agitation, 160 cc. of iced acetone, 100 gm. of finely crushed ice, are added, then very slowly and while cooling, 250 cc. of 5N ammonia solution are added. The 2,3,α - trimethoxy-10β-acetoxy-12β-carbomethoxy-8aα,9,10,11,12,12aα-hexahydro-13(14)-dehydroberbine begins to crystallize, and an additional 50 cc. of 10N ammonia solution are added to complete the precipitation. The mixture is vacuum filtered. The filter cake is washed with water, dried and yields a first fraction of 4.5 gm. of the compound having a melting point of 185° C. The mother liquor furnishes, by extraction with methylene chloride, an additional 1.4 gm. of raw product which are taken up in a mixture of methylene chloride and methanol to obtain 0.35 gm. of the product melting at 183.5° C. (that is a total of 4.85 gm., which is 60% of theoretical yield from the beginning of the syntheisis). The compound is crystallized by dissolution in methylene chloride. The solution is filtered, concentrated and the compound is reprecipitated by the addition of methanol. After vacuum filtration, the filter cake is washed with methanol and dried at 75° C. 2,3,11α-trimethoxy-10β-acetoxy - 12β-carbomethoxy-8aα,9,10,11,12,12aα-hexahydro-13(14)-dehydro-berbine having a melting point of 186° C. and a specific rotation $[\alpha]_D^{20}=+27°$ (c=0.5% in pyridine), is soluble in chloroform and methylene chloride, slightly soluble in methyl and ethyl and insoluble in water.

*Analysis.*—$C_{24}H_{31}O_7N$; molecular weight=445. Calculated: C, 64.70%; H, 7.01%; N, 3.14%. Found: C, 64.9%; H, 7.0%; N, 3.3%.

*Step e.*—2,3,11α - trimethoxy-10β-acetoxy-12β-carbomethoxy - 8aα,9,10,11,12,12aα - hexahydro - 14α - berbine (VII, wherein $R_1=R_4=R_5=R_6=H$, $R_2=R_3=OCH_3$, $R_8=R_9=CH_3$).

200 mgm. of the tetracyclic compound obtained in step *d* are dissolved in 6 cc. of methanol and 1.2 cc. of 2N hydrochloric acid, potassium borohydride is added in small portions while cooling until the pH reaches 9, then 25 cc. of water are introduced. 2,3,11α-trimethoxy-10β-acetoxy - 12β-carbomethoxy-8aα,9,10,11,12,12aα-hexahydro-14α-berbine crystallizes out and the mixture is vacuum filtered. The filter cake is washed and dried at 100° C. 180 mgm. (that is 90% of theory) of the raw product having a melting point of 229° C. is obtained. It is dissolved in 4 cc. of methylene chloride. The solution is filtered and concentrated and the product is precipitated by the addition of methanol. After vacuum filtering, washing with methanol and drying, 150 mgm. of the product, having a melting point of 229° C. and a specific rotation $[\alpha]_D^{20} = -145°$ (c=0.5% in pyridine) are obtained. It is soluble in chloroform and methylene chloride, slightly soluble in methyl and ethyl alcohol and insoluble in water.

*Analysis.*—$C_{24}H_{33}NO_7$; molecular weight=447.51. Calculated: C, 64.41%; H, 7.43%; O, 25.03%; N, 3.13%. Found: C, 64.5%; H, 7.2%; O, 25.1%; N, 3.3.

*Step f.*—2,3,11α - trimethoxy - 10β-acetoxy-12β-carbomethoxy - 8aα,9,10,11,12,12aα - hexahydro - 14β - berbine (VIII, $R_1=R_4=R_5=R_6=H$, $R_2=R_3=OCH_3$, $R_8=R_9=CH_3$).

4.75 gm. of the tetracyclic compound obtained in step d, 50 cc. of acetone, 0.5 cc. of a saturated solution of ferric chloride, and 50 cc. 2N perchloric acid are heated to reflux, and under agitation, 12.5 gm. of powdered zinc are introduced over a period of 15 minutes. The heating is maintained for a further half an hour. The acetone is then decanted, 150 cc. water are added thereto and the mixture extracted with methylene chloride. The extracts are combined and washed with water and with 5N ammonia, dried, and then distilled to dryness. A residue of 2.9 gm. is obtained which is dissolved in acetone and allowed to stand over night in a refrigerator. An abundant solid mass of crystals is produced. The mixture is vacuum filtered. The precipitate is washed with a mixture of methanol and ether (1:3) and dried. The first fraction of 2,3,11α-trimethoxy-10β-acetoxy-12β-carbomethoxy-8aα,9,10,11,12,12aα-hexahydro - 14β - berbine (VIII) melting point=173° C., weighs 1.24 gm. The mother liquor which is distilled to dryness furnishes a residue, which, treated like the first fraction, produces 0.14 gm. of the product melting at 170° C. The first two fractions are purified by recrystallization from acetone and a pure product having a melting point of 182° C. and a specific rotation $[\alpha]_D^{20} = -89°$ (c=0.5% in chloroform) is obtained. It is soluble in acetone and chloroform, slightly soluble in methanol, insoluble in water and almost insoluble in ether.

*Analysis.*—$C_{24}H_{33}NO_7$; molecular weight=447.51. Calculated: C, 64.41%; H, 7.43%; N, 3.13%. Found: C, 64.4%; H, 7.2%; N, 3.1%.

*Step g.*—2,3,11α - trimethoxy-10β-hydroxy-12β-carbomethoxy-8aα,9,10,11,12,12aα-hexahydro-14β-berbine (IX, wherein $R_1=R_4=R_5=R_6=H$, $R_2=R_3=OCH_3$, $R_8R_9=CH_3$).

To 100 mgm. of the 14β-isomer compound obtained in the previous step, in 4 cc. of methanol, are added 40 mgm. of sodium borohydride and the mixture is heated to reflux for 2 hours. The reaction solution, after cooling, is concentrated to 0.5 cc. 2.5 cc. of water are added to the concentrated solution and crystallization is initiated by scratching. The mixture is iced and vacuum filtered, and the filter cake is dried at 75° C. 83 mgm. of 2,3,11α - trimethoxy - 10β - hydroxy - 12β - carbomethoxy-aα,9,10,11,2,2aα hexahydro-14β-berbine having a melting point of 112–13° C. and again at 165° C. is obtained. The product is taken up in anhydrous ether, heated to reflux, filtered, concentrated and vacuum filtered to recover, after drying, 70 mgm. of product, having a melting point of 182° C., which is obtained in the form of small colorless rods. It is soluble in chloroform, slightly soluble in methanol and ether and insoluble in water.

*Step h.*—2,3,11α - trimethoxy - 10β(3',4',5' - trimethoxy - benzoyloxy) - 12β - carbomethoxy - 8aα,9,10,11,12,12aα - hexahydro - 14β - berbine (X, wherein $$R_1=R_4=R_5=R_6=$$

H, $R_2=R_3=OCH_3$, $R_8=R_9=CH_3$, $R_7=$trimethoxy - benzoyl).

100 mgm. of the 10β-hydroxy compound obtained in the previous step, 1 cc. of pyridine and 300 mgm. of 3,4,5-trimethoxy-benzoyl chloride are mixed together and heated in an atmosphere of nitrogen for 16 hours at 75° C. After cooling and adding 1 cc. of water, the mixture is heated again for 15 minutes at 50° C., and then extracted with methylene chloride. The extracts are washed with sulfuric acid, water, ammonia and again with water. The extract solution is dried, treated with animal charcoal and distilled to dryness. The residue is taken up in ether, the mixture is filtered, the filtrate is concentrated, and 2,3,11α - trimethoxy - 10β - (3',4',5' - trimethoxy - benzoyloxy) - 12β - carbomethoxy - 8aα,9,10,11,12,12aα - hexahydro-14β-berbine is separated by vacuum filtration. 55 mgm. (that is 42% of theory) of the product having a melting point of 189° C. is obtained. Recrystallization from ether furnishes a product melting at 191° C. and having a specific rotation $[\alpha]_D^{20} = -104°$ C. (c=0.5% in chloroform.) It is soluble in chloroform, slightly soluble in ether and insoluble in water.

*Analysis.*—$C_{32}H_{41}O_{10}N$; molecular weight =599. Calculated: C, 64.09%; H, 6.89%; N, 2.34%. Found: C, 64.3%; H, 6.8%; N, 2.6.

2,3,11α - trimethoxy - 10β - (3',4',5' - trimethoxy - benzoyloxy) - 12β - carbomethoxy - 8aα,9,10,11,12,12aα - hexahydro-14β-berbine is endowed with remarkable physiological properties. Especially, it exhibits a hypotensive activity.

It is well understood that the invention is not limited to the working examples given above. Any other of the indicated cyclic amines I or cyclic aldehydes II can be used. Also step h can be performed with any of the indicated acid chlorides. It is also possible to vary the temperature, the order of introduction of certain reagents or to use other solvents without departing from the scope of the invention. The invention is to be construed by the appended claims.

I claim:

1. Berbine derivatives of the formula:

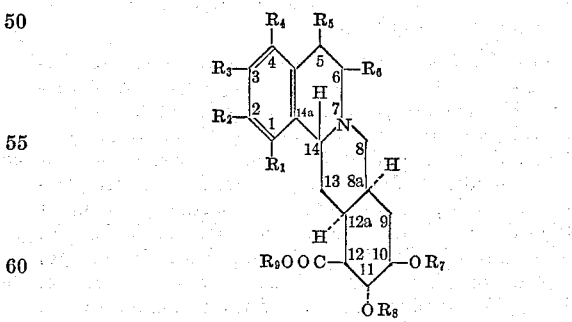

wherein $R_1$ to $R_4$ are radicals selected from the group consisting of hydrogen, halogen, hydroxyl, lower alkyl, lower alkoxy and phenyl lower alkoxy; $R_5$, $R_6$ and $R_8$ are radicals selected from the group consisting of hydrogen and lower alkyl; $R_7$ is a radical selected from the group consisting of hydrogen, lower alkanoyl, benzoyl, 3,4,5-trimethoxybenzoyl, 3,4,5-trimethoxycinnamyl and naphthoyl; and $R_9$ is lower alkyl.

2. 2,3,11α - trimethoxy - 10β - [3',4',5' - trimethoxy - benoyloxy] - 12β - carbomethoxy - 8aα,9,10,11,12,12aα - hexahydro - 14β - berbine.

3. 2,3,11α - trimethoxy - 10β - acetoxy - 12β - carbomethoxy - 8aα,9,10,11,12,12aα - hexahydro - 14β - berbine.

4. 2,3,11α - trimethoxy - 10β - hydroxy - 12β - carbomethoxy - 8aα,9,10,11,12,12aα - hexahydro - 14β - berbine.

5. 2,3,11α - trimethoxy - 10β - acetoxy - 12β - carbomethoxy - 8aα,9,10,11,12,12aα - hexahydro - 7 - 14,14-14a-diseco-7(8)-dehydro-berbine-14-oic acid.

6. 2,3,11α - trimethoxy - 10β - acetoxy - 12β - carbomethoxy - 8aα,9,10,11,12,12aα - hexahydro - 7 - 14, 14 - 14a-diseco-berine-4-oic acid.

7. 2,3,11α - trimethoxy - 10β - acetoxy - 12β - carbomethoxy - 14 - oxo - 8aα,9,10,11,12,12aα - hexahydro - 14-14a-seco-berbine.

8. 2,3,11α - trimethoxy - 10β - acetoxy - 12β - carbomethoxy - 8aα,9,10,11,12,12aα - hexahydro - 13 - dehydro - berbine.

9. 2,3,11α - trimethoxy - 10β - acetoxy 12β - carbomethoxy - 8aα,9,10,11,12,12aα - hexahydro-14α-berbine.

10. The process of producing berbine derivatives of the structural formula:

wherein R₁ to R₄ are radicals selected from the group consisting of hydrogen, halogen, hydroxyl, lower alkyl, lower alkoxy and phenyl lower alkoxy; R₅, R₆ and R₈ are radicals selected from the group consisting of hydrogen and lower alkyl; R₇ is a radical selected from the group consisting of hydrogen, lower alkanoyl, benzoyl, 3,4,5- trimethoxybenzoyl, 3,4,5-trimethoxycinnamyl and naphthoyl; and R₉ is lower alkyl, which comprises the steps of reacting a cyclic amine having the structural formula:

where R₁, R₂, R₃, R₄, R₅ and R₆ have the previously assigned values, with a cyclic aldehyde having the structural formula:

where R₈ and R₉ have the previously assigned values, in the presence of a tertiary organic base, reducing the resulting Schiff's base having the structural formula:

where R₁, R₂, R₃, R₄, R₅, R₆, R₈ and R₉ have the previous assigned values with an alkali metal borohydride, heating the resulting secondary amine having the structural formula:

where R₁, R₂, R₃, R₄, R₅, R₆, R₈ and R₉ have the previous assigned values at a temperature of about 80° C., refluxing the resulting lactam having the structural formula:

where R₁, R₂, R₃, R₄, R₅, R₆, R₈ and R₉ have the previous assigned values with phosphorus oxychloride and alkalinizing with ammonia, reducing the resulting tetracyclic compound having the structural formula:

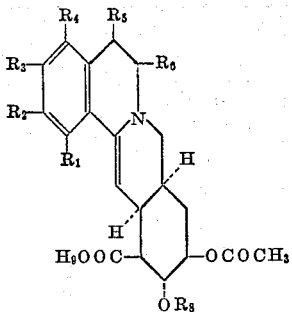

Where $R_1$, $R_2$, $R_3$, $R_4$, $R_5$, $R_6$, $R_8$ and $R_9$ have the previous assigned values by the action of zinc in the presence of perchloric acid and ferric chloride, separating the 14β-isomer by fractional crystallization, saponifying the resulting 14β-isomer having the structural formula:

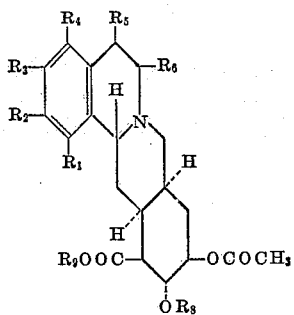

where $R_1$, $R_2$, $R_3$, $R_4$, $R_5$, $R_6$, $R_8$ and $R_9$ have the previous assigned values with a saponifying agent which saponifies the acetic acid, esterifying the resulting 10β-hydroxy derivative having the structural formula:

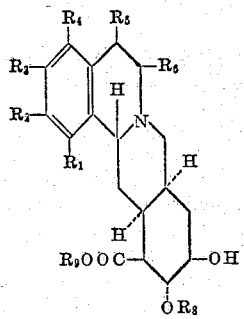

with an esterifying derivative of an acid selected from the group consisting of lower alkanoic, benzoic, 3,4,5-trimethoxybenzoic, 3,4,5-trimethoxycinammic and naphthoic acids, and recovering said berbine derivatives.

11. The process of claim 10 wherein the reaction of said cyclic amine with said cyclic aldehyde takes place in aqueous dimethylformamide.

12. The process of claim 10 wherein the step of separating said 14β-isomer from its 14α-isomer is effected by virtue of the difference in the solubilities of these two compounds in acetone.

13. The process of claim 10 wherein the step of saponifying said 14β-isomer is effected by means of an alkali metal borohydride.

14. The process of claim 10 wherein the step of esterifying is brought about by an acid chloride in the presence of pyridine.

References Cited in the file of this patent

Velluz: Annals Pharm. Francais, vol. 17 (1958), pages 15–26.

UNITED STATES PATENT OFFICE
CERTIFICATE OF CORRECTION

Patent No. 3,022,309                          February 20, 1962

Georges Muller

It is hereby certified that error appears in the above numbered patent requiring correction and that the said Letters Patent should read as corrected below.

Column 1, lines 42 to 54, and column 2, lines 32 to 44, the formula, each occurrence, should appear as shown below instead of as in the patent:

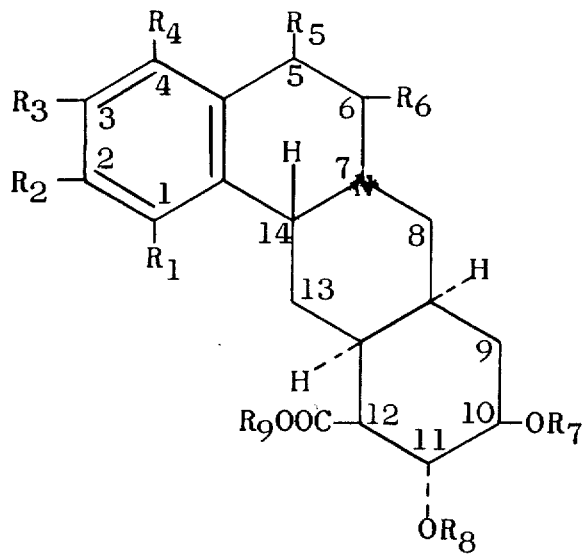

column 2, line 4, for "2,3-11α-" read -- 2,3,11α- --; column 5, line 68, for "-14,14,14a-" read -- -14,14-14a- --; column 6, line 18, after "place" insert a comma; line 43, for "2,3,α-" read -- 2,3,11α- --; line 55, for "syntheisis" read -- synthesis --; column 7, line 68, for "oxy-aα,9,10,11,2,2aα" read -- oxy-8aα,9,10,11,12,12aα- --; column 9, line 12, for "-berine-4-oic" read -- -berbine-14-oic --; line 19, for "-acetoxy 12β-" read -- -acetoxy-12β- --; column 11, lines 3 to 15, the formula should appear as shown below instead of as in the patent:

3,022,309

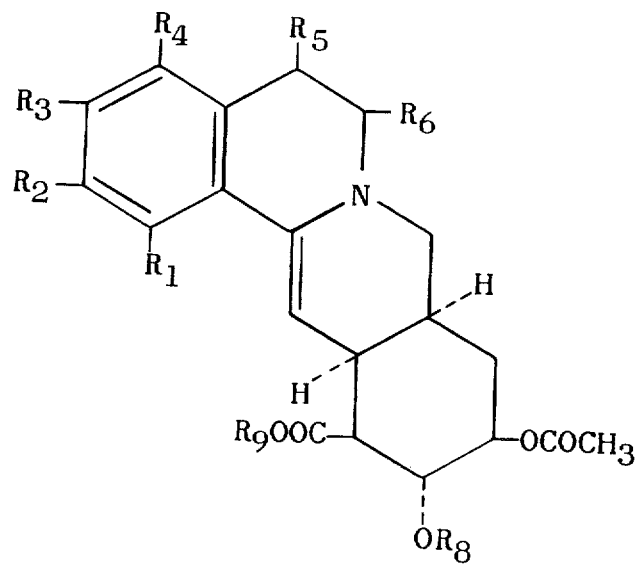

column 11, line 16, for "Where" read -- where --.

Signed and sealed this 31st day of July 1962.

(SEAL)
Attest:

ERNEST W. SWIDER
Attesting Officer

DAVID L. LADD